US 6,660,067 B2

(12) United States Patent
Stacy et al.

(10) Patent No.: US 6,660,067 B2
(45) Date of Patent: Dec. 9, 2003

(54) MECHANICAL OXYGEN SCAVENGER DEVICE

(75) Inventors: Melvin Stacy, Baton Rouge, LA (US); James Chen, Houston, TX (US)

(73) Assignee: Petreco International Inc., Houston, TX (US)

( * ) Notice: Subject to any disclaimer, the term of this patent is extended or adjusted under 35 U.S.C. 154(b) by 90 days.

(21) Appl. No.: 10/117,567

(22) Filed: Apr. 4, 2002

(65) Prior Publication Data

US 2002/0144598 A1 Oct. 10, 2002

Related U.S. Application Data

(60) Provisional application No. 60/281,919, filed on Apr. 5, 2001.

(51) Int. Cl.[7] .............................................. B01D 19/00
(52) U.S. Cl. .......................................... 95/260; 96/217
(58) Field of Search ................... 95/248, 260; 96/177, 96/196, 217

(56) References Cited

U.S. PATENT DOCUMENTS

| | | | |
|---|---|---|---|
| 2,294,827 A | * | 9/1942 | Booth |
| 2,718,275 A | | 9/1955 | Banks |
| 3,358,422 A | * | 12/1967 | Van Der Schee |
| 3,411,270 A | * | 11/1968 | Cornelius et al. |
| 3,647,069 A | | 3/1972 | Bailey |
| 3,815,331 A | * | 6/1974 | Hondermark |
| 4,097,249 A | * | 6/1978 | Phillips et al. |
| 4,136,747 A | | 1/1979 | Mallory et al. |
| 4,612,021 A | | 9/1986 | Bland et al. |
| 4,715,869 A | | 12/1987 | Ramshaw |
| 5,044,761 A | * | 9/1991 | Yuhki et al. |
| 5,585,005 A | | 12/1996 | Smith et al. |
| 5,766,321 A | | 6/1998 | Ishihara et al. |
| 2002/0144598 A1 | * | 10/2002 | Stacy et al. |

OTHER PUBLICATIONS

Patent Abstracts of Japan, vol. 018, No. 233 (C–1195), Apr. 28, 1994 & JP 06 023349 A (Japan Organo Co. Ltd.), Feb. 1, 1994, Abstract.
PCT International Search Report for PCT/US02/10315, Jun. 24, 2002.

* cited by examiner

Primary Examiner—Duane S. Smith
(74) Attorney, Agent, or Firm—Madan, Mossman & Sriram, P.C.

(57) ABSTRACT

It has been discovered that a mechanical device may be used to effectively displace a first undesired gas from within a liquid with a second desired or at least inert gas. The device is a vessel that receives the liquid containing the first gas and passes the liquid through a series of gasification chambers. Each gasification chamber has at least one mechanism that ingests and mixes a second gas into the liquid thereby physically displacing at least a portion of the first gas into a vapor space at the top of each gasification chamber from which it is subsequently removed. There is an absence of communication between the vapor spaces of adjacent chambers. The ingesting and mixing mechanisms may be a dispersed air flotation mechanism, and may be a conventional depurator. The liquid now containing the second gas and very little or none of the first gas is removed from the vessel for use.

22 Claims, 1 Drawing Sheet

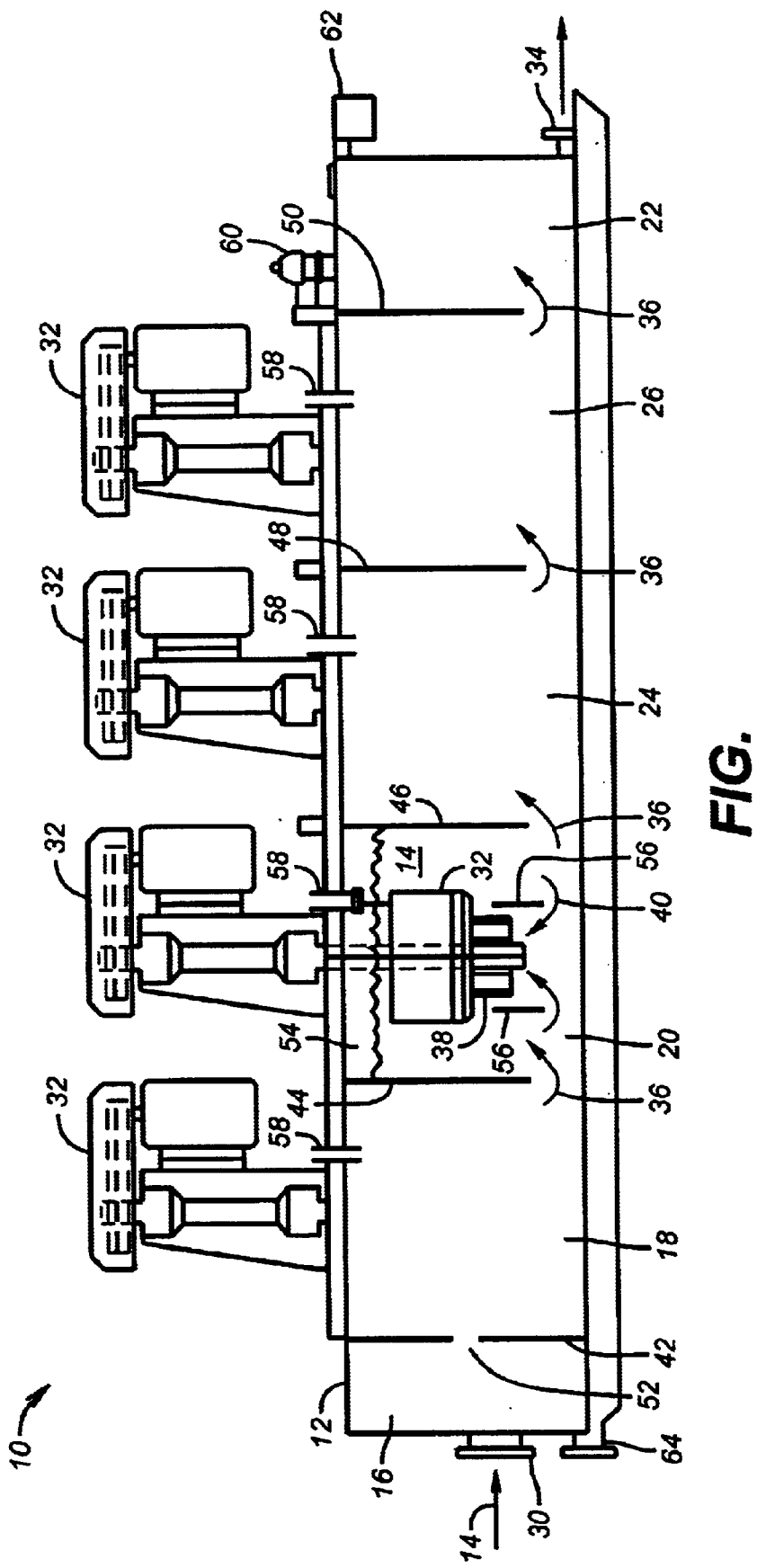

MECHANICAL OXYGEN SCAVENGER DEVICE

This application claims the benefit of U.S. Provisional Application No. 60/281,919 filed Apr. 5, 2001.

FIELD OF THE INVENTION

The present invention relates to methods and apparatus for removing a gas from a liquid, and more particularly relates, in one embodiment, to methods and apparatus for separating oxygen from water, particularly on an offshore hydrocarbon recovery platform.

BACKGROUND OF THE INVENTION

In many industries, including oil, paper and pulp, textile, electricity generating and food processing, there is an ever-present problem of handling water contaminated with various substances. In particular, water is often used to aid in the production of oil and gas on offshore platforms. This water is usually pumped into a formation in order to be able to pump oil out. The water pumped into the formation is typically available water, and is sea water in the case of offshore platforms. Seawater, like all naturally available water, contains small concentrations of oxygen, typically on the order of 6–10 ppm. The pumps, pipes and other structures through which the sea water is passed prior to injection into a subterranean formation typically are iron or copper alloys. The corrosion of these metals is catalyzed by the small quantities of oxygen present in the sea water, and thus it is desirable to remove as much of this oxygen as possible prior to transporting the water through the pipes, pumps, and other apparatus prior to formation injection. Because it is especially difficult to replace and repair equipment in offshore drilling operations due to much of the equipment being underwater and relatively inaccessible, it is particularly important to minimize corrosion of the equipment as much as possible.

Current practices for removing oxygen from water include stripping towers employing natural gas, and/or using a vacuum to reduce the boiling pressure of the water. Such prior art techniques usually cannot remove the oxygen to trace levels and thus chemical scavengers such as sulfites are used to remove oxygen further in a separate step. Unfortunately, floating offshore platforms typically are not tolerant of excessive vessel heights that are required of conventional stripping towers for oxygen removal. It would thus be advantageous to discover a method and apparatus for removing oxygen from water in an efficient manner involving a shorter physical profile, and particularly in an apparatus that is adapted for use on an offshore floating platform.

Apparatus for ingesting and mixing gas into a liquid body are known, such as those of U.S. Pat. No. 3,993,563, that includes a tank, a rotatable impeller fixed to a vertical drive shaft, and a vertically-extending conduit which surrounds the drive shaft and which extends to location in the liquid above the impeller to serve as a channel of communication between a source of gas and the impeller.

SUMMARY OF THE INVENTION

Accordingly, it is an object of the present invention to provide an apparatus for displacing a gas from a liquid, which apparatus is particularly suited to be used on floating offshore hydrocarbon recovery platforms.

It is another object of the present invention to provide a mechanical, cylindrical gas scavenger machine having a reduced height as compared with a stripping tower with a sump for chemical scavenger treatment to reduce oxygen content in a fluid such as water.

In carrying out these and other objects of the invention, there is provided, in one form, an apparatus for removing a gas from a liquid, where the apparatus includes a vessel for receiving a flow of liquid having a first gas contained therein, and where the vessel has a plurality of partitions sequentially dividing the vessel into at least a first gasification chamber and a second gasification chamber. Each adjacent chamber is in fluid or liquid communication with one another. Each chamber also has a vapor space, and there is no communication between the vapor spaces of adjacent chambers. The vessel also includes an inlet to introduce the flow of liquid into the gasification chambers. There is present a mechanism for ingesting and mixing a second gas into the liquid of each gasification chamber for creating a turbulent area and for displacing at least a portion of the first gas to the vapor space of each chamber. Finally, there is a vent in each chamber of the vessel for removing gas plus a liquid outlet from the outlet chamber.

BRIEF DESCRIPTION OF THE DRAWINGS

The single FIGURE is a schematic, cross-sectional illustration of one embodiment of the mechanical oxygen scavenger device of the invention.

It will be appreciated that the FIGURE is a schematic illustration that is not to scale or proportion to further illustrate the important parts of the invention.

DETAILED DESCRIPTION OF THE INVENTION

The present invention will now be described, by way of example, and not limitation, with the influent or treated liquid being water that contains oxygen that is replaced by the inert gas nitrogen. However, it will be appreciated that the invention is not limited to this particular liquid or to these particular gases. It is expected that the methods and apparatus will find utility with liquids other than water and gases other than oxygen and nitrogen. It is to be understood that the present invention has utility in numerous applications in which it is desirable to replace one gas from a liquid with another, and that the replaced gas, the liquid containing the new gas, or both may be the desired product of the process.

Referring now to the FIGURE, the system 10 of the apparatus of a preferred embodiment of the invention includes a vessel 12 for receiving a flow of liquid 14 having a first gas mixed therewith, where the vessel 12 in a preferred embodiment has a continuous cylindrical sidewall and is capable of withstanding substantial internal pressures. Vessel 12 is divided into a feed box or inlet chamber 16, at least a first gasification chamber 18, a second gasification chamber 20, and an outlet or discharge chamber 22, where each adjacent chamber can fluidly communicate with one another, that is, that a fluid in one chamber may and should flow into an adjacent chamber. The outlet chamber 22 may optionally function in secondary oxygen chemical scavenging. Outlet chamber 22 may optionally provide an injection booster pump plus level control as typically used in the process, though these latter functions will not influence the removal of the first gas by the second gas. It should be apparent that the flow of the liquid is from the inlet 30 to the outlet 34. The particular vessel 12 shown in the FIGURE also contains third and fourth gasification chambers 24 and 26, respectively. The chambers 16, 18, 20, 24, 26, and 22 and are divided by a plurality of generally vertical partitions 42, 44, 46, 48, and 50 respectively. Partitions 42 may, in one non-limiting embodiment, may extend from the top and bottom of the interior of vessel 12 and have an aperture 52 in the middle thereof to permit the fluid to flow into first gasification chamber 18. Partitions 44, 46, 48, and 50 extend from the interior top of vessel 12 downward, and are spaced from the interior bottom of vessel 12 to allow fluid communication between the adjacent chambers. The flow of liquid 14 follows liquid transport path 36 through the vessel 12, although within each chamber, some back flow 40 of liquid 14 into the impeller or rotor 38 will occur during agitation and mixing.

Each gasification chamber 18, 20, 24 and 26 may be, but is not required to be, essentially identical in design. Only gasification chamber 20 is shown in detail, and it may be assumed for the purposes of this non-limiting explanation that the other gasification chambers are the same. Each gasification chamber 18, 20, 24, and 26 will have a vapor space 54 above the liquid 14 level, but the vapor spaces of the adjacent chambers are not in communication with one another. Most preferably, there is an absence of communication between the vapor space of any gasification chamber with the vapor space of any other gasification chamber. The lengths of partitions 42, 44, 46, 48, and 50 are calculated to minimize the effect of pressure differential due to difference in flow rates under each respective partition.

Inlet chamber 16 has an inlet 30 to introduce the flow of liquid 14 to the inlet chamber 16. Each gasification chamber 18, 20, 24 and 26 has at least one mechanism 32 for ingesting and mixing gas into the liquid of each respective gasification chamber 18, 20, 24, and 26 for creating a turbulent area where the second gas displaces the first gas to an upper portion or vapor space 54 of the vessel 12 for each respective chamber 18, 20, 24, and 26. Gas ingesting and mixing mechanisms 32, in one non-limiting embodiment, may be submerged rotor mechanisms, and in another non-limiting embodiment are typically dispersed air flotation mechanisms, and are preferably the devices of U.S. Pat. No. 3,993,563, incorporated by reference herein, although it will be appreciated that other devices, including but not limited to, simple aerators, may be used. Mechanisms 32 may also be depurators. Mechanisms 32, such as described in U.S. Pat. No. 3,993,563, may each include one or more external gas circulation ports 56 to transfer gas into the rotor assembly of mechanism 32 from the vapor space 54 in the upper portion of vessel 12. Generally, mechanisms 32 create a vortex that draws air from vapor space 54 into the liquid. It is not the intent of the apparatus or method to re-circulate gas from the vapor space when removing the first dissolved gas with a second ingested gas. The second gas will be introduced via an external gas connection 58 which will be attached to a source external to vessel 12.

The gas ingesting and mixing mechanisms 32 obtain their source of second gas, optionally an inert gas such as nitrogen, from gas connect or inlet 58 in each gasification chamber 18, 20, 24, and 26. Each gas inlet 58 will be located within the standpipe diameter of each aeration chamber 18, 20, 24, and 26. Vertical standpipe partition 56 of generally cylindrical configuration is present between impeller 38 and vapor space 54. Communication between gas connect 58 and the gas ingesting and mixing mechanisms 32 is by means of conduits not shown in the FIGURE. Second gas is not injected into the vapor space 54 in each chamber 18, 20, 24 and 26. Instead, the first gas displaced from the fluid collects in the vapor spaces 54 and is removed from vessel 12 by tank breather 60, located in each chamber 18, 20, 24, and 26. It is permissible for a portion of second gas that passes through the liquid in each chamber to be vented through tank breather 60. It may be desirable or necessary for the outlet from the vapor space 54 in each gasification chamber to be equipped with a one-way gas valve to prevent backflow of the displaced first gas. That is, it is not a requirement of the apparatus or method that all of the second gas injected into vessel 12 be carried out in fluid 14 as it exits through outlet 34.

The second gas, e.g. nitrogen, is induced into the liquid, e.g. water, to be de-aerated by the mechanisms 32. This process also provides a means of controlling the partial pressure parameters, and allows the second gas to displace the first gas, e.g. oxygen, thus scavenging oxygen from the water. The first gas is physically not chemically displaced from the fluid by the second gas. Henry's Law of partial pressures requires that the first gas be displaced as the second gas is introduced. With each succeeding chamber, more of the first gas is replaced at each point. The number of stages or chambers is not critical, but should be sufficient in number to reduce the concentration of the first gas in the fluid to the desired level. It is expected that several gasification chambers would be necessary to remove sufficient amounts of the first gas in most cases. It should be apparent that the method of the invention is a continuous process. It is desirable to predict and control the amount of second gas ingestion based on rotor submergence of 32 and speed of rotor or impeller 38 to achieve the desired removal level for the first gas, and the rate at which the second gas is ingested.

Gas ingesting and mixing mechanisms 32 may also include water draft tubes (not shown) to transfer water into the rotor assemblies of mechanisms 32 exclusively from the bottom of the vessel 12. Inclusion of the water draft tube facilitates capacity variations within the same geometry because all water that enters the rotor assembly is directed to the rotor suction from the bottom of vessel 12, reducing fluid by-pass and short circuiting of the fluid around the turbulent areas. The treated effluent flows out of vessel 12 via outlet 34 which may have a valve therein (not shown). Flow through the vessel is maintained via pumps or innate system pressure (not shown).

There may also be present in vessel 12 an internal float displacer liquid level controller 62 (or other suitable liquid level controller) to regulate the rate at which fluid 14 enters vessel 12. The apparatus 10 may also have a control mechanism, such as a programmable logic controller (PLC) (not shown) for controlling the liquid level in the gasification chambers 18, 20, 24, 26 by obtaining level information from level transmitters (not shown) and regulating flow through level control valves (LCVs, not shown) which is in fluid communication with the liquid in each chamber. The exact natures of the level transmitters, PLC and LCVs are not critical and may be conventional in the art; however, their implementation in the oxygen scavenging apparatus of the invention is expected to be inventive.

In one embodiment of the invention, the oxygen scavenging apparatus 10 has a dual-cell design, that is, only two gasification cells, 18 and 20, but more may be used as illustrated in the FIGURE. An optional chemical scavenging feed unit (not shown), which is a standard feed unit for dispensing a metered amount of a first gas scavenging chemical, such as a sulfite, into fluid 14, to additionally treat the fluid for achieving optimum separation of the first gas from the water can be provided. This optional chemical treating may occur in outlet chamber 22. However, it may be appreciated that such an additional chemical scavenger treatment may not be necessary.

Although not shown, valves may be provided for blow-down of sludge that collects in the bottom of vessel 12. A drain 64 for cleaning out vessel 12 may also be provided. Also not shown are optional gauges to monitor the pressure of the effluent and the flow of gas.

In the method of the invention, a continuous flow of liquid 14 having a first gas mixed or dissolved therewith is introduced into inlet chamber 16 through inlet 30. Fluid 14 flows past partition 42 into the gasification chambers 18, 20, 24, and 26 sequentially via liquid transport path 36. In each chamber a flow of second gas is introduced into the liquid 14 by gas ingesting and mixing mechanisms 32, creating a turbulent area in the entirety of chambers 18, 20, 24, and 26, and allowing the second gas to physically displace the first gas. The first gas is forced out of the liquid 14 as bubbles to the upper portion of vessel 12 where it collects in the respective vapor space 54 of each chamber. First gas is collected and removed through tank breather 60.

Fluid 14, progressively more free of first gas, next underflows each partition 44, 46, 48, and 50 in turn flows through liquid outlet 34. It will be appreciated that it is not possible to predict with accuracy how much of the first gas may be removed from the liquid 14 since such removal depends upon a number of complex, interrelated factors including, but not limited to, the nature of the gases, the nature of the liquid, the concentration of the first gas in the liquid, the ability of the liquid to absorb the second gas, the temperature of the liquid, the pressures within the vessel 12, and the like. Nevertheless, in order to give some indication of the levels of reduction that might be achieved, it is expected that oxygen in sea water may be displaced by nitrogen from initial levels of about 6–10 ppm to about 0.5–1.0 ppm, in a non-limiting embodiment.

The rate at which scavenged liquid 14 may removed from vessel 12 may be regulated by a valve or valves (not shown) in response to software program commands or other control mechanism.

To summarize, advantages of the invention include, but are not necessarily limited to a decreased vessel height requirements as compared with separate stripping towers and reduced capital costs. These advantages are achieved through an oxygen scavenging machine (e.g. depurator) using physical methods to displace a first undesired gas with a second, inert gas. Floating production system operations (FPSO) installations utilizing water floods could also use the apparatus of the invention. In most expected methods of using the apparatus of the invention, it is not expected that the liquid only contain very small quantities of the second gas. It may be that the liquid contains appreciable amounts of the second gas, and this is acceptable.

In the foregoing specification, the invention has been described with reference to specific embodiments thereof, and has been demonstrated as effective in providing a device and apparatus for removing or stripping an undesired gas from a liquid. However, it will be evident that various modifications and changes can be made thereto without departing from the broader spirit or scope of the invention as set forth in the appended claims. Accordingly, the specification is to be regarded in an illustrative rather than a restrictive sense. For example, the distances between the partitions and the volumes of the various chambers may be changed or optimized from that illustrated and described, and even though they were not specifically identified or tried in a particular apparatus, would be anticipated to be within the scope of this invention. Similarly, gas ingestion and mixing mechanisms, and level transmitting and control devices different from those illustrated and described herein would be expected to find utility and be encompassed by the appended claims.

We claim:

1. An apparatus for removing a gas from a liquid, comprising:
   a) a vessel for receiving a flow of liquid having a first gas contained therein;
   b) a plurality of partitions sequentially dividing the vessel into at least a first gasification chamber and a second gasification chamber, each adjacent chamber fluidly communicating with one another, each chamber having a vapor space, in the absence of communication between the vapor spaces of adjacent chambers;
   c) an inlet to introduce the flow of liquid into the gasification chambers;
   d) a mechanism for ingesting and mixing a second gas into the liquid of each gasification chamber for creating a turbulent area and for displacing at least a portion of the first gas to the vapor space of each chamber; and
   e) a gas outlet in each chamber for removing the displaced first gas from the vapor space of each chamber; and
   f) an outlet for removing liquid from the vessel.

2. The apparatus of claim 1 further comprising a control mechanism for controlling the liquid level in the vessel.

3. The apparatus of claim 1 where the mechanism for ingesting and mixing is a submerged rotor mechanism.

4. The apparatus of claim 3 where the mechanism for ingesting and mixing is a depurator.

5. The apparatus of claim 1 further comprising a second gas feed to each mechanism for ingesting and mixing.

6. The apparatus of claim 1 further comprising a vent for removing the first gas from the apparatus.

7. The apparatus of claim 1 further comprising an inlet chamber between the inlet and the first gasification chamber.

8. The apparatus of claim 1 further comprising an outlet chamber between the second gasification chamber and the outlet.

9. An apparatus for removing a gas from a liquid, comprising:
   a) a vessel for receiving a flow of liquid having a first gas contained therein;
   b) a plurality of partitions sequentially dividing the vessel into at least a first gasification chamber and a second gasification chamber, each adjacent chamber fluidly communicating with one another, each chamber having a vapor space, in the absence of communication between the vapor spaces of adjacent chambers;
   c) an inlet to introduce the flow of liquid into the gasification chambers;
   d) a submerged rotor mechanism for ingesting and mixing a second gas into the liquid of each gasification chamber for creating a turbulent area and for displacing at least a portion of the first gas to the vapor space of each chamber; and
   e) a gas outlet in each chamber for removing the displaced first gas from the vapor space of each chamber;
   f) an outlet for removing liquid from the vessel; and
   g) a control mechanism for controlling the liquid level in the vessel.

10. A method for removing a gas from a liquid, the method comprising:
   a) providing a vessel comprising a plurality of partitions sequentially dividing the vessel into at least a first gasification chamber and a second gasification chamber, each adjacent chamber fluidly communicating with one another, each chamber having a vapor space, in the absence of communication between the vapor spaces of adjacent chambers;

b) introducing a flow of liquid containing a first gas into the inlet chamber through an inlet;

c) introducing a flow of a second gas into each of the gasification chambers for creating a turbulent area, and displacing at least a portion of the first gas from the liquid into the vapor space of the respective gasification chamber with the second gas;

d) removing the displaced first gas from the vapor space of each gasification chamber;

e) removing the liquid containing the second gas from the vessel through an outlet therein.

11. The method of claim 10 further comprising controlling the liquid level in the vessel.

12. The method of claim 10 where introducing the flow of second gas into the gasification chambers includes ingesting and mixing the second gas with the liquid.

13. The method of claim 12 where introducing the flow of second gas comprises operating a rotor at a predetermined speed and rotor submergence designed to control the rate at which the second gas is ingested.

14. The method of claim 12 where the ingesting and mixing of the second gas with the liquid is achieved with a submerged rotor mechanism.

15. The method of claim 12 where the ingesting and mixing of the second gas with the liquid is achieved with a depurator.

16. The method of claim 10 where the residence time for each gasification chamber is about one minute.

17. The method of claim 10 where the liquid is water.

18. The method of claim 10 where the first gas is oxygen.

19. The method of claim 10 where the second gas is nitrogen.

20. The method of claim 10 where in d) removing the displaced first gas, a portion of second gas is also removed.

21. The method of claim 10 where in a) providing a vessel, the vessel further comprises an inlet chamber between the inlet and the first gasification chamber.

22. The method of claim 10 where in a) providing a vessel, the vessel further comprises an outlet chamber between the second gasification chamber and the outlet.

* * * * *